(12) United States Patent
Yang

(10) Patent No.: US 9,058,616 B2
(45) Date of Patent: Jun. 16, 2015

(54) SYSTEM AND METHOD FOR PROVIDING MOBILE ADVERTISEMENT

(75) Inventor: Byoung Seok Yang, Seongnam-si (KR)

(73) Assignee: NHN CORPORATION, Gyeonggi-Do (KR)

( * ) Notice: Subject to any disclaimer, the term of this patent is extended or adjusted under 35 U.S.C. 154(b) by 0 days.

(21) Appl. No.: 13/495,433

(22) Filed: Jun. 13, 2012

(65) Prior Publication Data

US 2012/0323679 A1    Dec. 20, 2012

(30) Foreign Application Priority Data

Jun. 15, 2011 (KR) .......... 10-2011-0057930
Jun. 15, 2011 (KR) .......... 10-2011-0057983

(51) Int. Cl.
*G06Q 30/00* (2012.01)
*G06Q 30/02* (2012.01)
*H04M 3/487* (2006.01)

(52) U.S. Cl.
CPC ........ *G06Q 30/0241* (2013.01); *G06Q 30/0267* (2013.01); *G06Q 30/0269* (2013.01); *H04M 3/4878* (2013.01)

(58) Field of Classification Search
USPC ....................................... 705/14.64
See application file for complete search history.

(56) References Cited

U.S. PATENT DOCUMENTS

| | | | |
|---|---|---|---|
| 5,724,410 A * | 3/1998 | Parvulescu et al. ........ 379/88.18 |
| 6,173,259 B1 * | 1/2001 | Bijl et al. .................... 704/235 |
| 6,385,586 B1 * | 5/2002 | Dietz ........................... 704/277 |
| 6,671,262 B1 * | 12/2003 | Kung et al. .................... 370/260 |
| 2006/0143066 A1 * | 6/2006 | Calabria ......................... 705/10 |
| 2007/0116227 A1 * | 5/2007 | Vitenson et al. .......... 379/207.02 |
| 2008/0077561 A1 * | 3/2008 | Yomtobian ....................... 707/3 |
| 2009/0147778 A1 * | 6/2009 | Wanless et al. ............... 370/389 |
| 2010/0086107 A1 * | 4/2010 | Tzruya ....................... 379/88.01 |
| 2010/0228617 A1 * | 9/2010 | Ransom et al. ............ 705/14.25 |
| 2010/0234718 A1 * | 9/2010 | Sampath et al. .............. 600/407 |

FOREIGN PATENT DOCUMENTS

| | | |
|---|---|---|
| JP | 2002-010233 | 1/2002 |
| JP | 2007-241617 | 9/2007 |
| JP | 2009-524157 | 6/2009 |
| JP | 2010-165189 | 7/2010 |

OTHER PUBLICATIONS

Office Action for corresponding Japanese patent application No. 2012-135128 dated Oct. 29, 2013.

* cited by examiner

*Primary Examiner* — John G Weiss
*Assistant Examiner* — Scott C Anderson
(74) *Attorney, Agent, or Firm* — Harness, Dickey & Pierce, P.L.C.

(57) ABSTRACT

Provided is a system and method for providing advertisement information using voice recognition when performing a voice call based on a Voice over Internet Protocol (VoIP). The system for providing advertisement information based on a VoIP may include a voice recognition unit to recognize voice information received via an application of a user terminal, an information converter to convert the voice information to text information, an advertisement selector to select advertisement information corresponding to the text information among a plurality of pieces of advertisement information stored in a database, and a transmitter to transmit the selected advertisement information.

18 Claims, 10 Drawing Sheets

SYSTEM AND METHOD FOR PROVIDING MOBILE ADVERTISEMENT

CROSS-REFERENCE TO RELATED APPLICATION

This application claims priority from and the benefit of Korean Patent Application No. 10-2011-0057930, filed on Jun. 15, 2011, and Korean Patent Application No. 10-2011-0057983, filed on Jun. 15, 2011 both of which are hereby incorporated by reference for all purposes as if fully set forth herein.

BACKGROUND

1. Field

Exemplary embodiments of the present invention relate to a method and system for providing an advertisement to a telecommunication device.

2. Discussion of the Background

Developments in communications technology entail a high-speed proliferation of mobile terminals such as a smart phone performing a call through a Voice over Internet Protocol (VoIP).

Performing a voice call based on a VoIP may correspond to a technology for digitalizing and transmitting a voice of a user, and a mobile terminal using the voice call may provide various additional functions such as a function of transmitting data in addition to a function of a voice call which may not be provided by a conventional device using a second-generation wireless telephone technology (2G) network.

Thus, there is a desire for research into a method of providing an advertisement agreeable to a user when performing a voice call based on a VoIP.

With development in communication and video technologies, a video call provided through a mobile terminal and a fixed terminal is being used at an increased rate.

With an increase in a number of users using a user terminal such as a smart phone, a tablet personal computer (PC), a desktop computer, and the like, various social network services (SNSs) are being provided through the user terminal.

An SNS may correspond to a service enabling a user to share an interest, individuality, and the like with other users by forming a social relationship with the other users based on the user on the Internet.

Accordingly, there is a desire for a technology for providing an advertisement based on a social relationship callers that the callers would be interested in when the callers having the social relationship perform a video call.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide a method and system for providing an advertisement corresponding to a topic of users performing a call based on a voice recognition During a voice call based on a Voice over Internet Protocol (VoIP).

Exemplary embodiments of the present invention also provide a method and system for providing an advertisement that may synchronize displayed advertisement information between users when performing a voice call based on a VoIP.

Exemplary embodiments of the present invention also provide a method and system for providing an advertisement that may provide a target advertisement selected based on social information that indicates a social relationship formed between callers when the callers perform a video call.

Exemplary embodiments of the present invention also provide a method and system for providing an advertisement that may induce callers to purchase a product or a service of an advertiser by providing a target advertisement synchronized between the callers based on social information.

Additional features of the invention will be set forth in the description which follows, and in part will be apparent from the description, or may be learned by practice of the invention.

An exemplary embodiment of the present invention discloses a system for providing advertisement information based on a VoIP. The system includes a processor, a storage device and a voice recognition unit configured to recognize voice information received via an application of a user terminal. The system also includes an information converter configured to convert the voice information to text information, an advertisement selector configured to select advertisement information corresponding to the text information among a plurality of pieces of advertisement information stored in a database, and a transmitter configured to transmit the selected advertisement information.

Another exemplary embodiment of the present invention discloses an apparatus for providing advertisement information based on a VoIP, the apparatus includes a voice recognition module to recognize voice information received via an application, an information conversion module to convert the voice information to text information, a transmission and reception module to transmit the text information to an advertisement information providing server, and a display module to display the converted text information and advertisement information corresponding to the text information received from the advertisement information providing server.

Still another exemplary embodiment of the present invention discloses a method of providing advertisement information based on a VoIP performed by an advertisement information providing server, the method including recognizing voice information received via an application of a user terminal, converting the voice information to text information, selecting advertisement information corresponding to the text information among a plurality of pieces of advertisement information stored in a database, and transmitting the selected advertisement information.

Yet another exemplary embodiment of the present invention discloses a method of providing advertisement information based on a VoIP performed by a user terminal, the method including recognizing voice information received via an application, converting the voice information to text information, transmitting the text information to an advertisement information providing server, and displaying the converted text information and advertisement information corresponding to the text information received from the advertisement information providing server.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
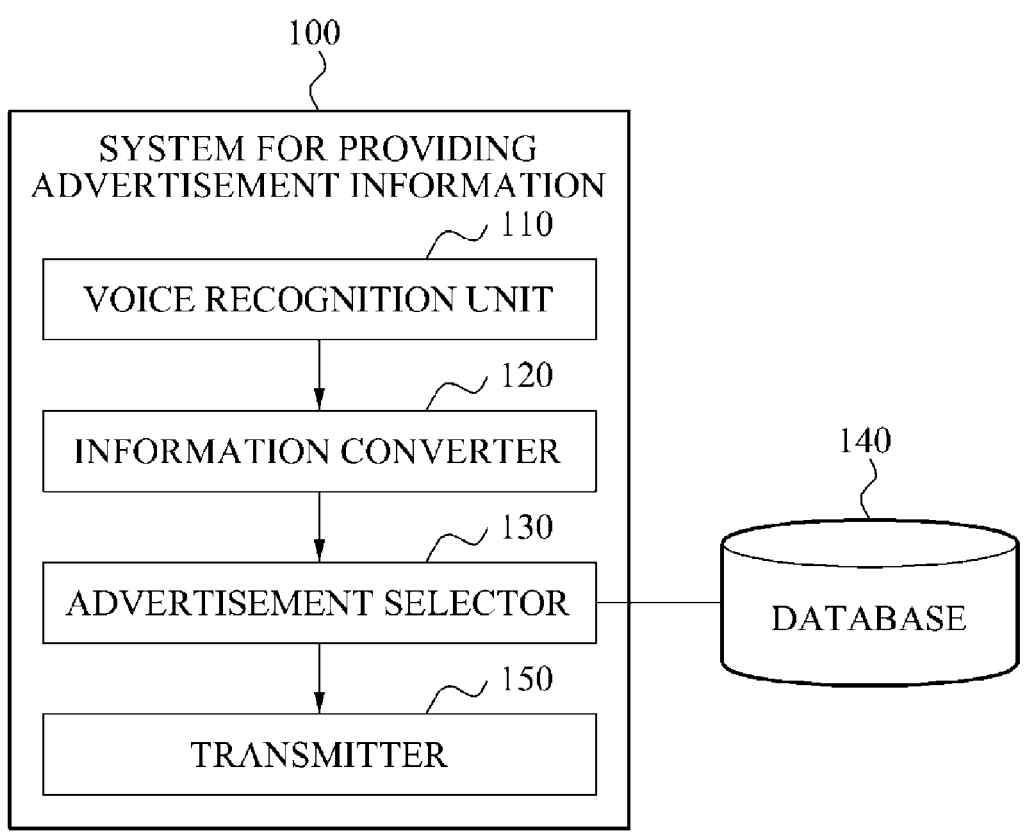
FIG. 1 is a block diagram illustrating a system for providing advertisement information according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is a block diagram illustrating a system for providing advertisement information according to an exemplary embodiment of the present invention. Referring to FIG. 1, a system for providing advertisement information 100 may include a voice recognition unit 110, an information converter 120, an advertisement selector 130, a database 140, and a transmitter 150.

A terminal may store an application for performing a voice call using a Voice over Internet Protocol (VoIP). The application may generate voice information by digitalizing a voice of the user, and transmit the voice information to the system for providing advertisement information 100. A user terminal may store an application for performing a voice call using a Voice over Internet Protocol (VoIP). In response to a user performing a call, the application may generate voice information by digitalizing a voice of the user, and transmit the voice information to the system for providing advertisement information 100.

The voice recognition unit 110 may recognize the voice information received from the application of the user terminal.

The information converter 120 may convert the voice information recognized by the voice recognition unit 110 to text information.

The advertisement selector 130 may select advertisement information corresponding to the text information converted by the information converter 120 among a plurality of pieces of advertisement information stored in the database 140.

Here, the information converter 120 may extract a keyword by analyzing the text information. In this instance, the advertisement selector 130 may select, from the database 140, advertisement information to be provided to the user based on the keyword extracted from the information converter 120.

Although not illustrated in FIG. 1, the system for providing advertisement information 100 may separately include a keyword extractor to extract a keyword from the text information, and the keyword extractor may extract a keyword by analyzing a context based on the text information converted by the information converter 120. In this instance, the advertisement selector 130 may select the advertisement information from a category, stored in the database 140, including the keyword extracted by the keyword extractor.

The database 140 may store advertisement information registered by an advertiser, and may store and maintain the advertisement information in a corresponding category for each keyword. In this instance, the advertisement information may not be limited to a type or a form of an advertisement, and may refer to an advertisement that may be provided to a mobile terminal. The database 140 may maintain and manage the advertisement information for each advertiser.

For example, the advertisement selector 130 may extract a word which matches the keyword extracted by the information converter 120 or the keyword extractor, or most frequently appears during a call between users by analyzing a context based on the text information, retrieve a category including the word from the database 140, and the transmitter 150 may transmits, to the user terminal, advertisement information corresponding to the retrieved category. Thus, an advertisement corresponding to content of a topic in a current conversation may be exposed to the users and more likely causes the users to purchase the product.

The transmitter 150 may transmit, to the user terminal, the advertisement information selected by the advertisement selector 130. In this instance, the transmitter 150 may transmit the text information for voice information along with the advertisement information.

The transmitter 150 may transmit the advertisement information via a packet tunnel separate from the voice information. In this instance, the advertisement information may be transmitted to an application of a sender and an application of a recipient.

In this instance, the system for providing advertisement information 100 may further include an advertisement information synchronizer to provide, to the application of the recipient, a webpage corresponding to the advertisement information from the application of the sender, and to provide, to the application of the sender, a webpage corresponding to the advertisement information from the application of the recipient.

For example, in response to the sender selecting, through a click, a touch, and the like, the advertisement information received from the system for providing advertisement information 100, the application of the user terminal of the sender may transmit, to the system for providing advertisement information 100, the information indicating that the advertisement information is selected.

In response to receiving the information about the selected advertisement, the system for providing advertisement information 100 may provide a corresponding webpage to the application of the sender so that the corresponding webpage may be displayed in the application. The system for providing advertisement information 100 may provide the corresponding webpage to the application of the recipient so that the corresponding webpage may be displayed in the application of the recipient, thereby synchronizing the advertisement information in applications between users to cause the sender and the recipient to be exposed to the same advertisement information.

When the recipient selects the advertisement information received from the system for providing advertisement information 100, a corresponding webpage may be displayed in the application of the sender, thereby causing the sender and the recipient to be exposed to the same advertisement information.

Accordingly, since each user may be exposed to a webpage for the same advertisement information when performing a voice call, a corresponding advertisement may naturally appear in a conversation and thus, a product may be purchased with relative ease.

Figure 2:
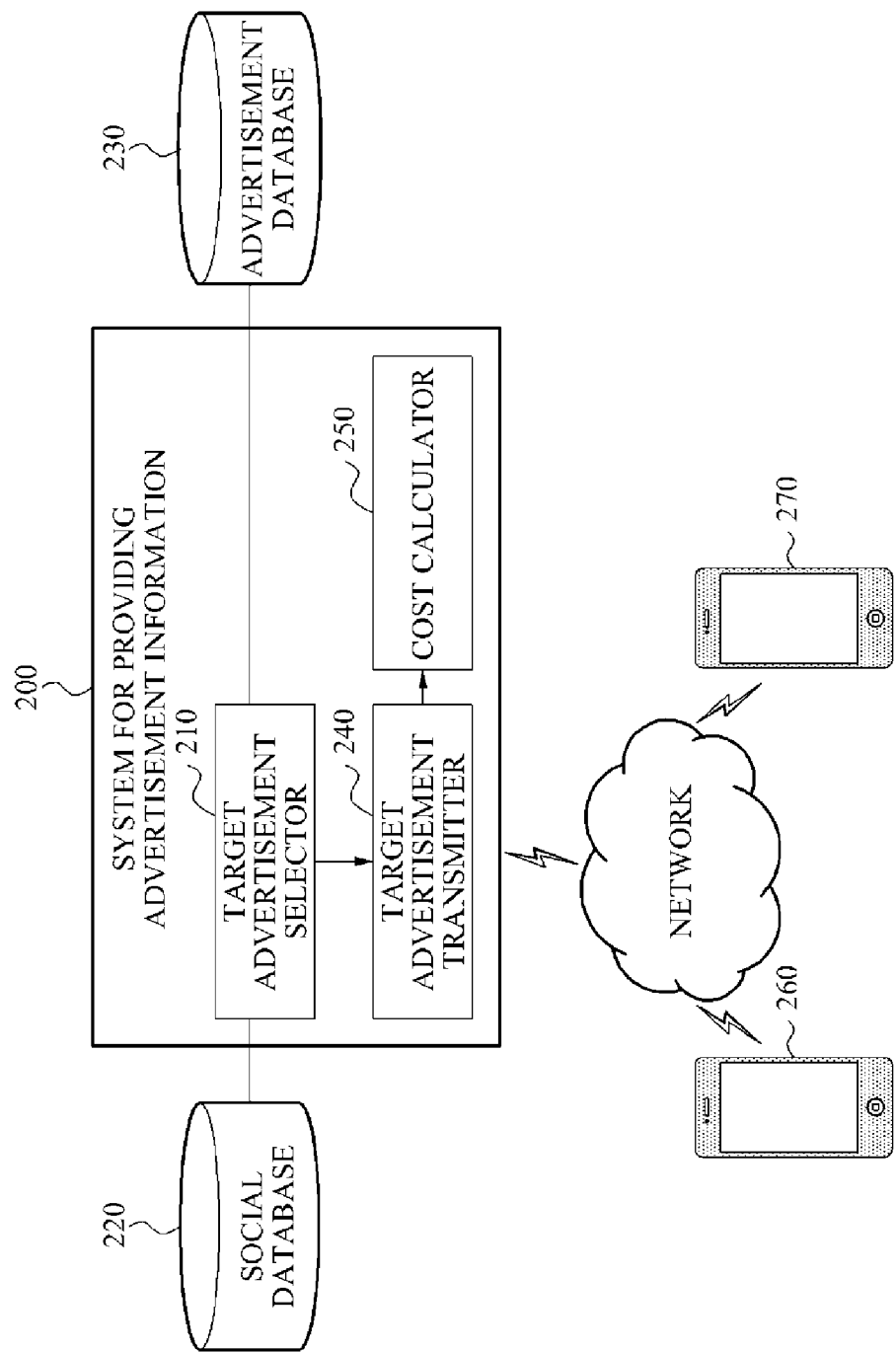
FIG. 2 is a block diagram illustrating a system for providing advertisement information according to another exemplary embodiment of the present invention.

FIG. 2 is a block diagram illustrating a system for providing advertisement information according to another exemplary embodiment of the present invention.

Referring to FIG. 2, a system for providing advertisement information 200 may include a target advertisement selector 210 and a target advertisement transmitter 240. The system for providing advertisement information 200 may further include a cost calculator 250. In this instance, a social database 220 and an advertisement database 230 may be included in the system for providing advertisement information 200, and may be separated from the system for providing advertisement information 200 to be located outside of the system for providing advertisement information 200.

The system for providing advertisement information 200 may provide, via a network, a target advertisement to a user terminal of a caller. The user terminal may store an application providing a video call service.

The target advertisement selector 210 may select a target advertisement using social information of the callers desiring to perform a video call.

For example, when a video call is attempted through an application of the user terminal, the target advertisement selector 210 may obtain (or extract), from the social database 220, social information of the callers desiring to perform the video call. The target advertisement selector 210 may select, from a plurality of advertisements stored in the advertisement database 230, at least one target advertisement corresponding to advertisement information.

In this instance, the social database 220 may store the social information corresponding to information indicating a social relationship formed between callers through a social network service (SNS).

Here, the social information may include at least one of user information and relationship information for users forming a social relationship. For example, the user information may include, but not limited to, at least one of region information, gender information, age information, occupation information, academic proficiency information, and interested area information of a user. The relationship information may correspond to information classifying relationships between users forming a social relationship, or may include information about whether a relationship between users corresponds to co-workers, school friends, family members, or neighbors.

In this instance, when the social database 220 fails to store relationship information for the callers, the target advertisement selector 210 may estimate a relationship between the callers based on the user information for the callers, and generate relationship information. For example, the target advertisement selector 210 may estimate whether a relationship between the callers corresponds to co-workers based on age information, occupation information, and the like included in the user information for the callers. The target advertisement selector 210 may generate relationship information based on the estimated relationship between the callers. Subsequently, the target advertisement selector 210 may select a target advertisement corresponding to the relationship information from a plurality of advertisements stored in the advertisement database 230.

Here, the advertisement database 230 may store advertisements, classified for each category, requested from an advertiser. For example, the advertisements may be classified for an advertised area, an advertisement subject, a target gender, and the like, and be stored in the advertisement database 230. Then, the target advertisement selector 210 may select, from the advertisements classified for each category, at least one target advertisement corresponding to the social information for the callers. As described in the foregoing, the target advertisement selector 210 may select, from a plurality of advertisements, a target advertisement that is of interest to all callers performing a video call by selecting the target advertisement using the social information.

In this instance, when a plurality of target advertisements is selected, the target advertisement selector 210 may arrange the plurality of target advertisements in a descending order of a degree of association based on the degree of association between the social information and the selected target advertisement.

The target advertisement transmitter 240 may synchronize, between the callers, the target advertisement selected by the target advertisement selector 210, and transmit the selected target advertisement to the user terminal.

As an example, the target advertisement transmitter 240 may synchronize a target advertisement so that the same target advertisement may be displayed in each of user terminals 260 and 270 by transmitting the target advertisement to the user terminal 260 and 270. Then, the same target advertisement may be displayed in the user terminal 260 and 270 at the same point in time. Thus, the callers may have a conversation while viewing the same target advertisement that is of interest to each of the callers. In this instance, when the callers have a conversation regarding purchasing a product, a present, a trip, a meal at a restaurant, and the like, the target advertisement may be used to cause the callers to purchase a product, or to visit a store.

As another example, when a plurality of target advertisements is selected in the target advertisement selector 210, the target advertisement transmitter 240 may synchronize the plurality of target advertisements in an order of arranged target advertisements, and transmit the plurality of target advertisements to the user terminal. For example, when the plurality of target advertisements is arranged in an order of a target advertisement 1, a target advertisement 2, and a target advertisement 3, the target advertisement transmitter 240 may synchronize, between the callers, and transmit the plurality of target advertisements so that the target advertisement 1 may be displayed in the user terminal 260 and 270 at the same point in time, the target advertisement 2 may be displayed in the user terminal 260 and 270 at the same point in time, and then the target advertisement 3 may be displayed in the user terminal 260 and 270 at the same point in time. In this instance, the target advertisement transmitter 240 may synchronize and transmit, in real time, the plurality of target advertisements until a point in time at which the video call is terminated.

The target advertisement transmitter 240 may transmit, to the user terminal, a webpage corresponding to a target advertisement selected by a caller based on information about a selected advertisement being received. For example, when a target advertisement is displayed in the user terminal in a form of a banner, and information about a selected advertisement is received from the user terminal in response to the caller selecting the target advertisement using an object such as a mouse, a keyboard, a finger, and the like, the target advertisement transmitter 240 may transmit, to the user terminal, a webpage corresponding to the selected target advertisement.

As an example, when a caller selects a target advertisement, the target advertisement transmitter 240 may transmit a webpage corresponding to the target advertisement selected by the caller to both of the user terminal 260 of the caller and another user terminal 270 of another caller. Thus, when one of the callers selects a target advertisement, the target advertisement transmitter 240 may transmit, to all of the callers, a webpage corresponding to the selected target advertisement, thereby inducing the callers to have a conversation regarding the target advertisement.

As another example, the target advertisement transmitter 240 may transmit a webpage corresponding to the selected target advertisement to a caller, among the callers, selecting the target advertisement.

As still another example, the target advertisement transmitter 240 may transmit a webpage corresponding to the selected target advertisement to a caller, among the callers, selecting an advertisement viewing option when performing a video call.

The target advertisement transmitter 240 may transmit, to the user terminal, display control information along with a synchronized target advertisement. Here, the display control information may refer to information for controlling a location of displaying image information and target information between callers performing a video call. Controlling, using the display control information, of the location of displaying image information and target information will be further described with reference to FIG. 5, FIG. 6 and FIG. 7.

The cost calculator 250 may calculate a cost of a video call based on whether the callers select the target advertisement. As mentioned, callers may select the target advertisement using an object.

For example, in response to the callers selecting, using an object, the target advertisement when performing a video call, the cost calculator 250 may reduce a cost of the video call based on a number of selected target advertisements.

Descriptions provided with reference to FIG. 2 include selecting, using social information between callers, a target advertisement for a common item such as a subject, a field, and the like interested in by all callers. However, the system for providing advertisement information 200 may select a target advertisement based on a video call between callers.

For example, the target advertisement selector 210 may select, using background information of a video call, voice information, information about a calling time of the callers in addition to the social information, a target advertisement from a plurality of advertisements stored in the advertisement database 230. For example, when the callers perform a video call through a user terminal, an application stored in the user terminal may generate voice information by digitalizing a voice of a caller, and transmit the generated voice information to the system for providing advertisement information 200.

The target advertisement selector 210 may extract a keyword from the voice information received from the user terminal, and select a target advertisement corresponding to social information and the extracted keyword from the plurality of advertisements stored in the advertisement database 230.

The application stored in the user terminal may generate background information of a video call by extracting a background from a video of a caller, and transmit the background information of the video call to the system for providing advertisement information 200. Then, the target advertisement selector 210 may determine a keyword corresponding to the received background information of the video call, and select a target advertisement corresponding to the determined keyword and social information. For example, when the background of the video call of the caller corresponds to the Eiffel Tower, the target advertisement selector 210 may determine the Eiffel Tower to be the keyword corresponding to the background information of the video call. The target advertisement selector 210 may select a target advertisement corresponding to the Eiffel Tower and social information.

The application stored in the user terminal may generate information about a calling time based on a period of time at which the callers perform a video call, and transmit the information about a calling time to the system for providing advertisement information 200. Then, the target advertisement selector 210 may select a target advertisement corresponding to the information about a calling time and social information. For example, when the information about a calling time corresponds to night, and a relationship between the callers corresponds to family members, the target advertisement selector 210 may select, as the target advertisement, an advertisement for a late-night meal based on the information about a calling time and social information.

The target advertisement selector 210 may select a target advertisement using both of the background information of the video call and the social information, both of the voice information and the social information, both of the information about a calling time and the social information, or a combination of the background information of the video call, the social information, and the voice information, thereby providing, as a target advertisement, an advertisement regarding a topic or a subject of interest to the callers.

Hereinafter, an apparatus for providing advertisement information according to exemplary embodiments of the present invention will be described with reference to FIG. 3.

Figure 3:
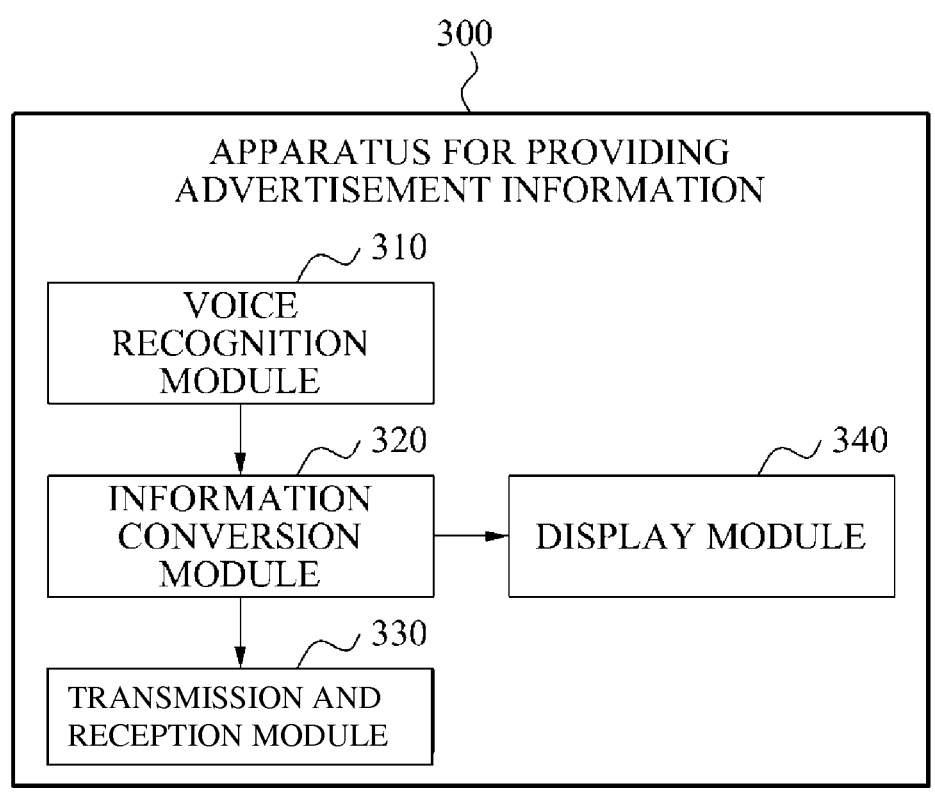
FIG. 3 is a block diagram illustrating an apparatus for providing advertisement information according to exemplary embodiments of the present invention.

FIG. 3 is a block diagram illustrating an apparatus for providing advertisement information 300 according to exemplary embodiments of the present invention.

The apparatus for providing advertisement information 300 may be included in a user terminal to provide a user with advertisement information received from a system for providing advertisement information when the user performs an audio call based on a VoIP.

The apparatus for providing advertisement information 300 may include a voice recognition module 310, an information conversion module 320, a transmission module 330, and a display module 340.

The voice recognition module 310 may recognize voice information received via an application.

The information conversion module 320 may convert, to text information, the voice information recognized by the voice recognition module 310. In this instance, the text information converted by the information conversion module 320 may be transmitted to the transmission and reception module 330 to be used for receiving advertisement information corresponding to the text information in the system for providing advertisement information. The display module 340 may display the advertisement information transmitted from the transmission and reception module 330 in a form of captions in the user terminal.

The transmission and reception module 330 may transmit the text information converted by the information conversion module 320 to the system for providing advertisement information.

In response to receiving the text information from the apparatus for providing advertisement information 300, the system for providing advertisement information may select, from a database, advertisement information matching content of a conversation between users, and transmit the advertisement information to the apparatus for providing advertisement information 300 of a sender and a recipient as described in the foregoing.

In this instance, the system for providing advertisement information may transmit, to an application of the sender and an application of the recipient, the advertisement information via a packet tunnel separate from the voice information.

The display module 340 may display advertisement information corresponding to the text information received from the system for providing advertisement information via the transmission and reception module 330. In this instance, the display module 340 may display, on a screen of the user terminal, the advertisement information received from the system for providing advertisement information via the transmission and reception module 330.

Thereafter, in response to the user selecting the displayed advertisement information, the system for providing advertisement information may provide a webpage corresponding to the selected advertisement information, and transmit information about the webpage to applications of the user and another user performing a call with the user, thereby synchronizing provided the advertisement information between users.

Figure 4:
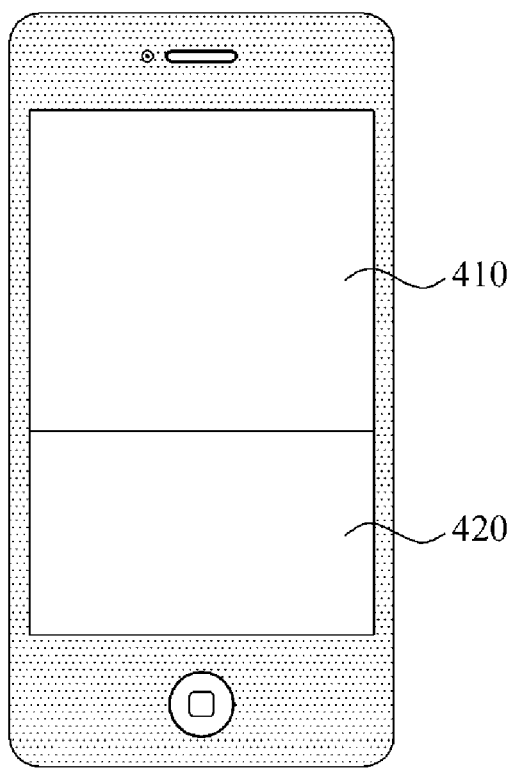
FIG. 4 is a diagram illustrating advertisement information and text information displayed on a user terminal according to exemplary embodiments of the present invention.

FIG. 4 is a diagram illustrating advertisement information and text information displayed on a user terminal according to exemplary embodiments of the present invention.

Referring to FIG. 4, a screen of a user terminal may be divided into a first area 410 and a second area 420. For example, in response to a user performing a call, advertisement information matching content of the call between users may be received from a system for providing advertisement information, and be displayed in the first area 410 or the second area 420 in the user terminal.

Text information converted from voice information may be displayed in the second area 420 when the advertisement information is displayed in the first area 410, and the text information may be displayed in the first area 410 when the advertisement information is displayed in the second area 420. However, descriptions provided with reference to FIG. 4 may correspond to an example, and the present invention may not be limited thereto. A scope of the present invention may include displaying the advertisement information and the text information on a screen using a plurality of areas.

Figure 5:
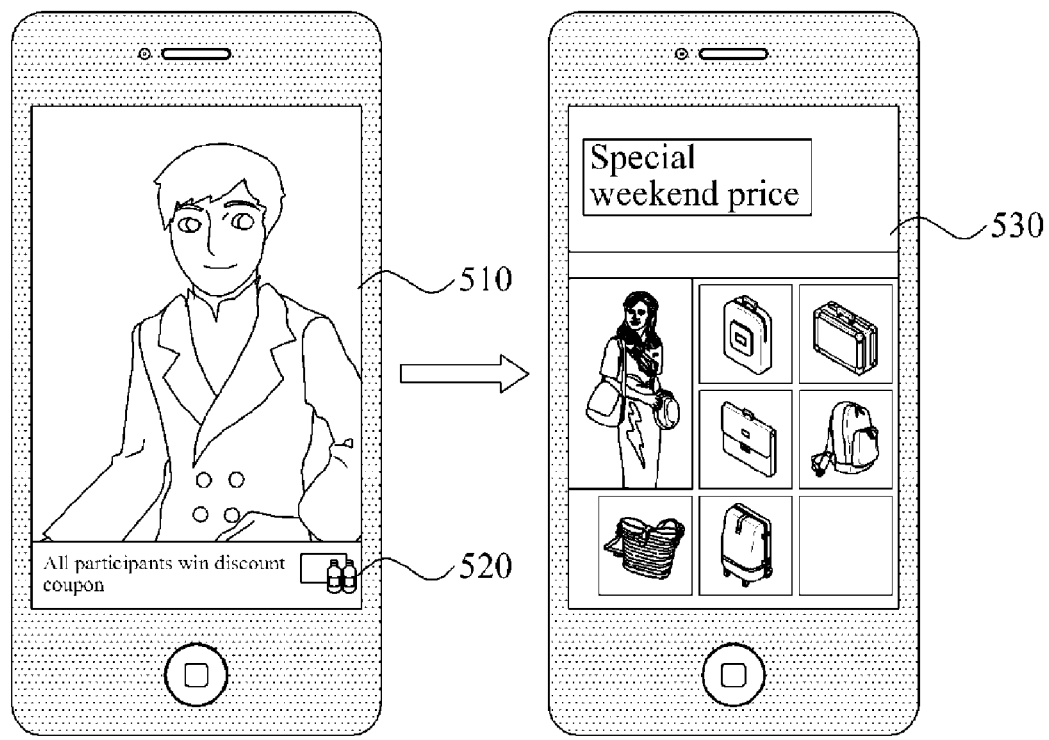
FIG. 5 is a diagram illustrating an example of displaying a target advertisement using display control information in a system for providing advertisement information according to exemplary embodiments of the present invention.

FIG. 5 is a diagram illustrating an example of displaying a target advertisement using display control information in a system for providing advertisement information according to exemplary embodiments of the present invention.

Referring to FIG. 5, a system for providing advertisement information may transmit, to a user terminal, display control information for controlling a target advertisement to be displayed on an entire screen of the user terminal.

For example, image information 510 for another caller performing a video call and a target advertisement 520 in a form of a banner may be displayed in the user terminal. In this instance, in response to the target advertisement 520 selected by a caller, the system for providing advertisement information may transmit, to the user terminal, a webpage corresponding to the display control information and the target advertisement 520. Then, an application stored in the user terminal may display, on the entire screen of the user terminal, a target advertisement 530 instead of the image information 510 based on the display control information. The image information 510 may be displayed in the user terminal before the target advertisement is selected, and the target advertisement 530 may be displayed in the user terminal after the target advertisement is selected. In this instance, a voice of the other caller may be output through a speaker of the user terminal.

Figure 6:
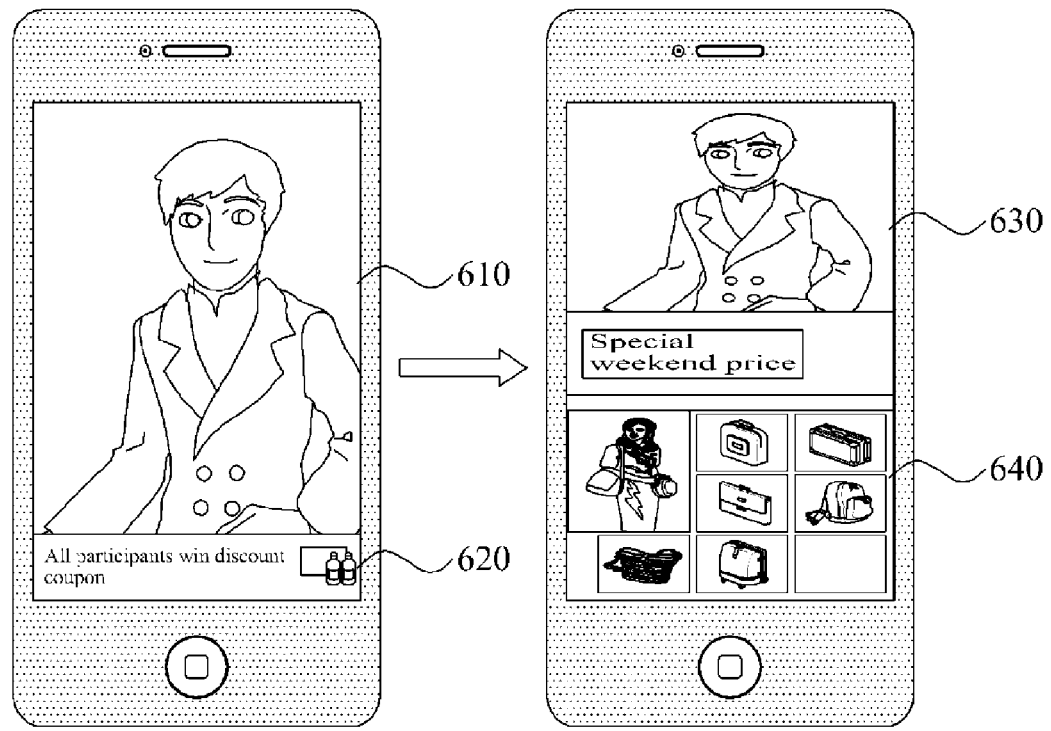
FIG. 6 is a diagram illustrating an example of concurrently displaying a target advertisement and image information using display control information in a system for providing advertisement information according to exemplary embodiments of the present invention.

FIG. 6 is a diagram illustrating an example of concurrently displaying a target advertisement and image information using display control information in a system for providing advertisement information according to exemplary embodiments of the present invention.

Referring to FIG. 6, a system for providing advertisement information may transmit, to a user terminal, display control information for controlling a target advertisement and image information to be concurrently displayed by dividing a screen of the user terminal.

For example, image information 610 for another caller performing a video call and a target advertisement 620 in the form of a banner may be displayed in the user terminal. In this instance, in response to the target advertisement 620 selected by a caller, the system for providing advertisement information may transmit, to the user terminal, a webpage corresponding to the display control information and the target advertisement 620. Then, an application stored in the user terminal may divide a screen according to the display control information, and display, on the divided screen, image information 630 and a webpage 640 corresponding to the target advertisement 620. In this instance, the screen may be divided into a top portion and a bottom portion, or into a left portion and a right portion, and the image information 630 and the webpage 640 corresponding to the target advertisement 620 may be displayed on a divided screen.

Figure 7:
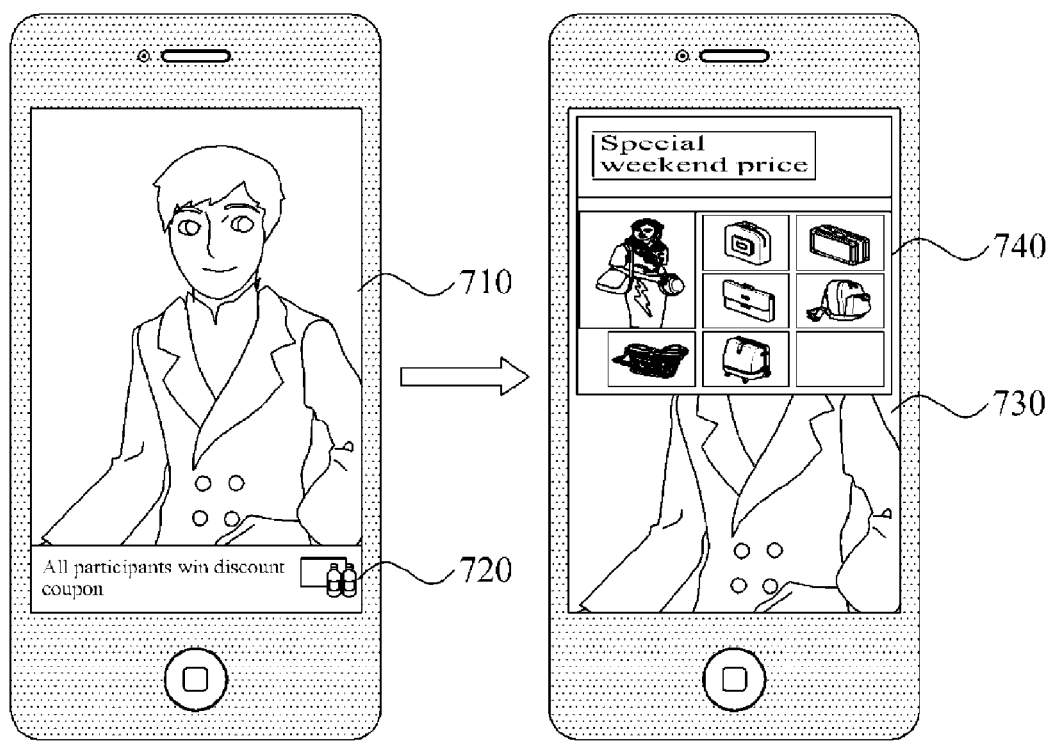
FIG. 7 is a diagram illustrating an example of displaying image information and a target advertisement overlapping the image information using display control information in a system for providing advertisement information according to exemplary embodiments of the present invention.

FIG. 7 is a diagram illustrating an example of displaying image information and a target advertisement overlapping the image information using display control information in a system for providing advertisement information according to exemplary embodiments of the present invention.

Referring to FIG. 7, a system for providing advertisement information may transmit, to a user terminal, display control information for controlling a target advertisement and image information to be displayed so that the target advertisement may overlap the image information.

For example, image information 710 for another caller performing a video call and a target advertisement 720 in a form of a banner may be displayed in the user terminal. In this instance, in response to the target advertisement 720 selected by a caller, the system for providing advertisement information may transmit, to the user terminal, a webpage corresponding to the display control information and the target advertisement 720. Then, an application stored in the user terminal may display, based on the display control information, a webpage 740 corresponding to the target advertisement 720 on image information 730 displayed on an entire screen so that the webpage 740 may overlap the image information 730.

Displaying, in a user terminal, of a target advertisement in a form of a banner is described with reference to FIGS. 5 through 7 for convenience of description, which may correspond to an example. The system for providing advertisement information may display, in the user terminal, the target advertisement in another form other than the banner.

Figure 8:
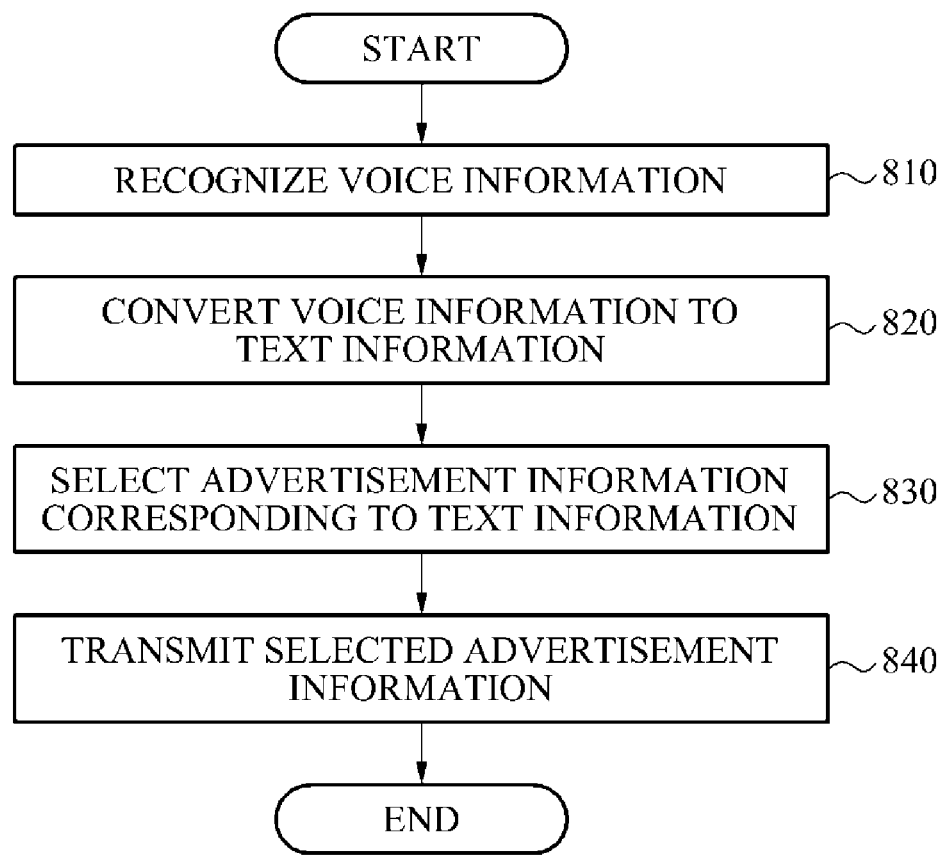
FIG. 8 is a flowchart illustrating a method of providing advertisement information by a system for providing advertisement information according to an exemplary embodiment of the present invention.

FIG. 8 is a flowchart illustrating a method of providing advertisement information by a system for providing advertisement information according to an exemplary embodiment of the present invention. Hereinafter, an operation of providing, by a system for providing advertisement information, advertisement information to a user will be further described with reference to FIG. 8.

In operation 810, a voice recognition unit of the system for providing advertisement information may recognize voice information received from an application of a user. In operation 820, an information converter, to text information, may convert the voice information received from the voice recognition unit. Here, the information converter may extract a keyword from content of a conversation between users by analyzing a context when converting the voice information to the text information.

Thereafter, in operation 830, an advertisement selector may select, from a plurality of pieces of advertisement information stored in a database, advertisement information matching a topic between users based on the keyword extracted from the text information.

In operation 840, a transmitter may transmit, to a user terminal, the advertisement information selected by the advertisement selector. In this instance, the transmitter may transmit, to an application of a sender and an application of a recipient, the text information along with the advertisement information via a packet tunnel separate from a packet tunnel for transmitting the voice information.

As described in the foregoing, the advertisement information transmitted to the user terminal may be displayed on a screen of the user terminal of the sender and the recipient. In this instance, in response to the sender selecting the advertisement information, a webpage corresponding to the selected advertisement information may be provided to both the sender and the recipient. In response to the recipient selecting the advertisement information, the webpage may be provided to both of the recipient and the sender.

Figure 9:
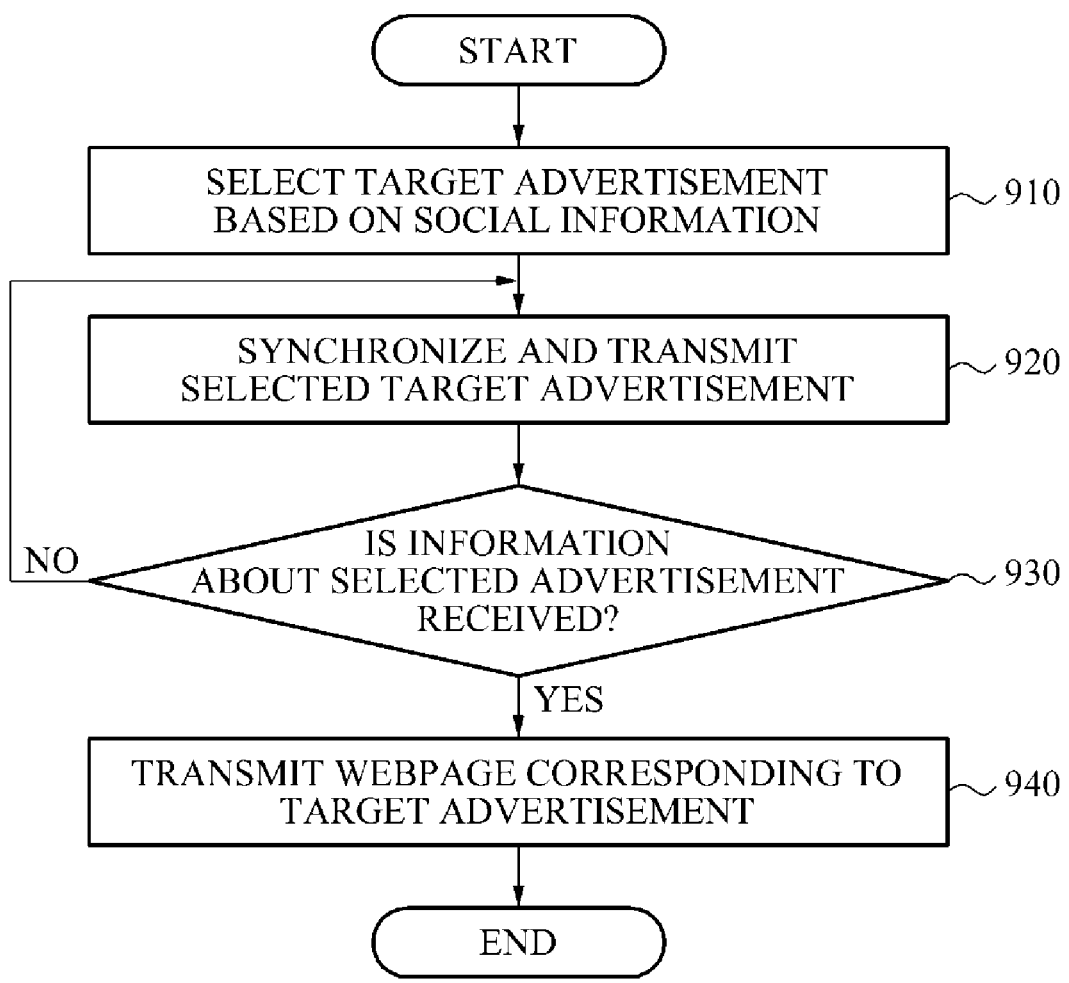
FIG. 9 is a flowchart illustrating a method of providing advertisement information by a system for providing advertisement information according to another exemplary embodiment of the present invention.

FIG. 9 is a flowchart illustrating a method of providing advertisement information by a system for providing advertisement information according to another exemplary embodiment of the present invention.

In operation 910, when callers forming a social relationship through an SNS desire to perform a video call, a system for providing advertisement information may select a target advertisement based on social information of the callers.

In this instance, the system for providing advertisement information may obtain the social information of the callers from pieces of social information stored in a social database. The system for providing advertisement information may select a target advertisement corresponding to the social information from a plurality of advertisements stored in an advertisement database.

The system for providing advertisement information may select, using background information of a video call, voice information, information about a calling time of the callers in addition to the social information, a target advertisement from a plurality of advertisements stored in the advertisement database.

As an example, when the callers desire to perform a video call through a user terminal, an application stored in the user terminal may generate voice information by digitalizing a voice of a caller, and transmit the generated voice information to the system for providing advertisement information. Then, the system for providing advertisement information may extract a keyword from the voice information received from the user terminal, and select a target advertisement corresponding to social information and the extracted keyword from the plurality of advertisements stored in the advertisement database.

As another example, the application stored in the user terminal may generate background information of a video call by extracting a background from a video of a caller, and transmit the background information of the video call to the system for providing advertisement information. The system for providing advertisement information may determine a keyword corresponding to the background information of the video call, and select a target advertisement corresponding to the determined keyword and social information.

As still another example, the application stored in the user terminal may generate information about a calling time based on a period of time at which the callers perform a video call, and transmit the information about a calling time to the system for providing advertisement information. Then, the system for providing advertisement information may select a target advertisement corresponding to the information about a calling time and social information. As described in the foregoing, the system for providing advertisement information may select a target advertisement using the social information along with the background information of the video call, the voice information, or the image information, thereby providing, as a target advertisement, an advertisement regarding a topic or a subject of interest to all of the callers.

In operation 920, the system for providing advertisement information may synchronize the selected target advertisement between the callers, and transmit the target advertisement to the user terminal.

For example, the system for providing advertisement information may synchronize and transmit the selected target advertisement so that the selected target advertisement may be displayed in each user terminal of the callers at the same point in time. In this instance, when a plurality of target advertisements is selected, the system for providing advertisement information may arrange the plurality of target advertisements according to a degree of association between the social information and the selected target advertisement. The system for providing advertisement information may synchronize, between the callers, and transmit the plurality of arranged target advertisements. Then, a target advertisement 1 may be displayed in a user terminal of a caller and another user terminal of another caller at the same point in time, a target advertisement 2 may be displayed in the user terminals of the callers at the same point in time, and a target advertisement 3 may be displayed in the user terminals of the callers at the same point in time according to an arranged order.

In response to information about a selected advertisement received from the user terminal in operation 930, the system for providing advertisement information may transmit, to the user terminal, a webpage corresponding to the selected target advertisement in operation 940.

As an example, in response to a caller selecting a target advertisement, the system for providing advertisement information may transmit, to both of the user terminal of the caller and another user terminal of another caller, a webpage corresponding to the target advertisement selected by the caller. Thus, when one of the callers selects a target advertisement, the system for providing advertisement information may transmit, to all of the callers, a webpage corresponding to the selected target advertisement, thereby inducing the callers to have a conversation regarding the selected target advertisement.

As another example, the system for providing advertisement information may transmit the webpage corresponding to the selected target advertisement to a caller, among the callers, selecting the target advertisement.

As still another example, the system for providing advertisement information may transmit a webpage corresponding to the selected target advertisement to a caller, among the callers, selecting an advertisement viewing option when performing a video call.

In this instance, the system for providing advertisement information may transmit, to the user terminal, display control information along with the webpage for the target advertisement. Here, the display control information may correspond to information for controlling a state of displaying, in the user terminal, target information and image information for the callers performing a video call.

As an example, an application store in the user terminal may divide a screen of the user terminal based on the display control information, and display, on the divided screen, a webpage corresponding to the image information and the target information, respectively.

As another example, the application may display a webpage corresponding to the target advertisement on an entire screen of the user terminal based on the display control information. The voice information may be output through a speaker of the user terminal so as not to interfere with a call when the image information fails to be displayed in the user terminal.

As still another example, the application may display a webpage corresponding to the target advertisement so that the webpage may overlap the image information displayed on the entire screen of the user terminal according to the display control information.

The system for providing advertisement information may calculate a cost of a video call based on whether the target advertisement displayed in the user terminal is selected. For example, the cost of the video call may be calculated based on a number of instances of selecting the target advertisement using an object when performing the video call. That is, the cost of the video call may be reduced according to a number of instances of viewing at least one target advertisement displayed when performing the video call.

Figure 10:
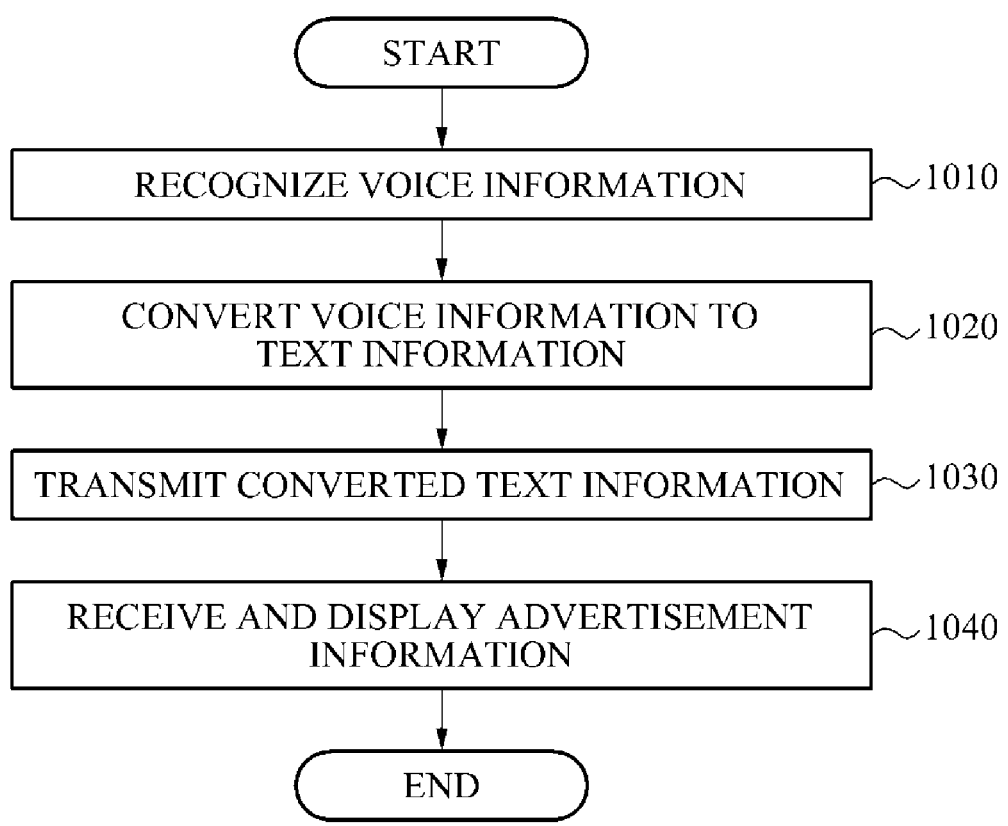
FIG. 10 is a flowchart illustrating a method of providing advertisement information by an apparatus for providing advertisement information according to exemplary embodiments of the present invention.

FIG. 10 is a flowchart illustrating a method of providing advertisement information by an apparatus for providing advertisement information according to exemplary embodiments of the present invention. Hereinafter, an operation of providing advertisement information using the apparatus for providing advertisement information described with reference to FIG. 3 will be described.

In operation 1010, in response to a voice input to a user terminal by a user performing a call, a voice recognition module of the apparatus for providing advertisement information may recognize voice information received via an application. In operation 1020, an information conversion module may convert, to text information, the voice information recognized by the voice recognition module. In this instance, the text information may be provided to a transmission and reception module to be transmitted to a system for providing advertisement information in operation 1030, and may be transmitted to a display module to be displayed on a screen of the user terminal.

In operation 1040, in response to receiving advertisement information corresponding to the text information from the system for providing advertisement information, the display module may display the advertisement information on an area other than an area in which the advertisement information is provided.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the well-known variety and available to those having skill in the computer software arts.

According to exemplary embodiments of the present invention, it is possible to provide an advertisement corresponding to a topic of users since voice information is converted to text information, and advertisement corresponding to content of a call is selected based on the converted text information when performing a voice call based on a Voice over Internet Protocol (VoIP).

According to exemplary embodiments of the present invention, it is possible to synchronize displayed advertisement information between users by providing a webpage for advertisement information to a user and another user performing a call with the user when the advertisement information is selected by the user.

According to exemplary embodiments of the present invention, it is possible to provide a target advertisement selected using social information that indicates a social relationship formed between callers when the callers forming the social relationship perform a video call.

According to exemplary embodiments of the present invention, it is possible to cause callers to purchase a product or a service of an advertiser by providing a target advertisement synchronized between the callers using social information.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system for providing advertisement information based on a Voice over Internet Protocol (VoIP), the system comprising:
   a processor; and
   a storage unit, the storage unit including instructions that, when executed by the processor, cause the processor to implement,
      a voice recognition unit stored on the storage unit and configured to recognize voice information received via an application of a first user terminal when the first user terminal participates in a call with a second user terminal;
      an information converter configured to convert the voice information to text information;

an advertisement selector configured to select advertisement information corresponding to the text information among a plurality of pieces of advertisement information stored in a database, the advertisement selector being configured to determine, from among a plurality of types of social relationships, a type of social relationship between a first user associated with the first user terminal and a second user associated with a second user terminal, the advertisement selector being configured to select the advertisement information based on the determined type of social relationship between the first and second users; and a target advertisement transmitter configured to transmit the selected advertisement information to the first user terminal and the second user terminal, synchronize the selected target advertisement between the first user terminal and the second user terminal so that the selected target advertisement is displayed on the first user terminal and the second user terminal at the same point in time, and transmit a webpage corresponding to the selected target advertisement to the first user terminal and the second user terminal if the first user terminal or the second user terminal receives input indicating that a user has chosen the selected target advertisement.

2. The system of claim 1, wherein the target advertisement transmitter is configured to transmit the selected advertisement information to the first user terminal and a second user terminal via a packet tunnel separate from the voice information, and the target advertisement transmitter is configured to transmit the text information along with the selected advertisement information.

3. The system of claim 1, wherein the storage unit further includes instructions for causing the processor to implement,
a keyword extractor configured to extract a first keyword from the text information, the extracted keyword being one of a plurality of keywords, and wherein,
the plurality of pieces of advertisement information are stored, respectively, in a plurality of categories in the database,
the plurality of categories correspond to the plurality of keywords, respectively, and
the advertisement selector is configured to select the selected advertisement information from the category, from among the plurality of categories, that corresponds to the first keyword.

4. The system of claim 1, wherein the system is configured to receive first information indicating that the selected advertisement information has been chosen, through the first user terminal or the second user terminal, by a user, and
the storage unit further includes instructions for causing the processor to implement,
an advertisement information synchronizer configured to transmit a webpage to the first user terminal and the second user terminal in response to the receipt of the first information.

5. The system of claim 1, wherein the plurality of types of social relationships includes at least one of co-workers, school friends, family members, and neighbors.

6. The system of claim 1, wherein the target advertisement transmitter is configured to,
synchronize the selected target advertisement between the first and second user terminals by transmitting the selected target advertisement so that the selected target advertisement is displayed on the first user terminal and the second user terminal, and
transmit a webpage corresponding to the selected target advertisement to the first user terminal and the second user terminal, if the first user terminal or the second user terminal receives input indicating that a user has chosen the selected target advertisement.

7. The system of claim 5, wherein the call between the first user terminal and the second user terminal is a video call, and the target advertisement transmitter is configured to transmit at least one of
display control information for controlling the target advertisement and image information for the second caller to be displayed concurrently by dividing a screen of the first user terminal,
display control information for controlling the target advertisement to be displayed on an entire screen of the first user terminal, and
display control information for controlling the image information for the second caller to be displayed on an entire screen of the first user terminal and controlling the target advertisement to be displayed overlapping the displayed image information.

8. The system of claim 1, wherein the target advertisement selector is configured to generate relationship information for the first and second users based on user information including at least one of region information, gender information, age information, occupation information, academic proficiency information, and interested area information of the first and second user, and configured to determine the type of social relationship between the first and second users based on the relationship information.

9. The system of claim 1, wherein the target advertisement selector is configured to select the target advertisement based on at least one keyword extracted using background information of a video call of the first and second users and voice information of the first and second users.

10. The system of claim 1, wherein the call between the first user terminal and the second user terminal is a video call, and the storage unit further includes instructions for causing the processor to implement,
a cost calculator configured to calculate a cost of a video call between the first and second user terminals based on whether the target advertisement is selected through at least one of the first and second user terminals.

11. The system of claim 1, further comprising:
a social database configured to store social information of the first and second users,
wherein the target advertisement selector is configured to obtain, from the social database, social information for the first and second users in response to the first and second user terminals attempting to perform a video call.

12. A method of providing advertisement information based on a Voice over Internet Protocol (VoIP) performed by an advertisement information providing server using a processor, the method comprising:
recognizing voice information received via an application of a first user terminal when the first user terminal participates in a VoIP call with a second user terminal;
converting, by the processor, the voice information to text information;
selecting advertisement information corresponding to the text information among a plurality of pieces of advertisement information stored in a database, the selecting the advertisement information including determining, from among a plurality of types of social relationships, a type of social relationship between a first user associated with the first user terminal and a second user associated with a second user terminal, and selecting the advertisement information based on the determined type of social relationship between the first and second users; and transmitting the selected advertisement information to the first user terminal and the second user terminal, the transmitting the selected advertisement information including synchronizing the selected target advertisement between the first user terminal and the second user terminal so that the selected target advertisement is displayed on the first user terminal and the second user terminal at the same point in time; and transmitting a webpage corresponding to the selected target advertisement to the first user terminal and the second user terminal if the first user terminal or the second user terminal receives input indicating that a user has chosen the selected target advertisement.

13. The method of claim 12, wherein the transmitting comprises:

transmitting the selected advertisement information to the first user terminal and a second user terminal via a packet tunnel separate from the voice information, and transmitting the text information along with the advertisement information.

14. The method of claim 12, wherein:

the database stores the plurality of pieces of advertisement information in a plurality of categories, respectively, the plurality of categories correspond to a plurality of keywords, respectively, and the selecting comprises:

extracting a keyword from the text information; and selecting the selected advertising information, from among the plurality of pieces of advertising information, based on the category, from among the plurality of categories, that corresponds to the extracted keyword, the extracted keyword being one of the plurality of keywords.

15. The method of claim 12, further comprising:

receiving first information indicating that the selected advertisement information has been chosen, through the first user terminal or the second user terminal, by a user; and transmitting a webpage corresponding to the selected advertisement information to the first user terminal and the second user terminal in response to the receipt of the first information.

16. The method of claim 12, wherein the plurality of types of social relationships includes at least one of co-workers, school friends, family members, and neighbors.

17. The method of claim 12, further comprising:

transmitting a webpage corresponding to the selected target advertisement to the first user terminal and the second user terminal, if the first user terminal or the second user terminal receives input indicating that a user has chosen the selected target advertisement.

18. A system for providing advertisement information, the system comprising:

a processor; and a storage unit, the storage unit including instructions that, when executed by the processor, cause the processor to implement, a voice recognition unit stored on the storage unit and configured to recognize voice information received, via a receiver, from a first user terminal when the first user terminal participates in a call with a second user terminal;

an information converter configured to convert the voice information to text information;

an advertisement selector configured to select advertisement information corresponding to the text information, the advertisement selector being configured to determine, from among a plurality of types of social relationships, a type of social relationship between a first user associated with the first user terminal and a second user associated with a second user terminal, the advertisement selector being configured to select the advertisement information based on the determined type of social relationship between the first and second users; and a target advertisement transmitter configured to transmit the selected advertisement information, to the first user terminal and the second user terminal, synchronize the selected target advertisement between the first user terminal and the second user terminal so that the selected target advertisement is displayed on the first user terminal and the second user terminal at the same point in time, and transmit a webpage corresponding to the selected target advertisement to the first user terminal and the second user terminal if the first user terminal or the second user terminal receives input indicating that a user has chosen the selected target advertisement.

* * * * *